(12) United States Patent
Roberts

(10) Patent No.: US 7,591,604 B2
(45) Date of Patent: Sep. 22, 2009

(54) KNUCKLE JOINT AND RELEASE/LOCKING MECHANISM THEREFOR

(75) Inventor: Ana-Maria Roberts, Brandon (GB)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/259,917

(22) Filed: Oct. 27, 2005

(65) Prior Publication Data

US 2006/0096770 A1    May 11, 2006

(30) Foreign Application Priority Data

Nov. 10, 2004   (EP)   ................................ 04256943

(51) Int. Cl.
*F16C 11/00* (2006.01)
(52) U.S. Cl. ........................... 403/101; 403/93; 403/96; 403/324; 403/325; 16/326; 81/177.7
(58) Field of Classification Search ................... 403/92, 403/93, 96, 97, 101, 324, 325, 322.1; 16/324, 16/326, 438; 81/177.7, 177.8, 177.9
See application file for complete search history.

(56) References Cited

U.S. PATENT DOCUMENTS

| | | | |
|---|---|---|---|
| 4,929,113 A | 5/1990 | Sheu | |
| 5,197,817 A | 3/1993 | Wood et al. | |
| 5,520,474 A * | 5/1996 | Liu | 403/97 |
| 5,867,911 A * | 2/1999 | Yates et al. | 403/97 |
| 8,384,033 | 4/2002 | Hung et al. | |
| 6,817,424 B1 * | 11/2004 | Su et al. | 173/217 |
| 6,848,344 B2 * | 2/2005 | Rocco | 81/177.8 |
| 6,938,706 B2 * | 9/2005 | Ng | 173/216 |
| 2003/0159549 A1 | 8/2003 | Rocco | |

FOREIGN PATENT DOCUMENTS

WO    WO 02/77471 A1    3/2002

* cited by examiner

*Primary Examiner*—Michael P Ferguson
(74) *Attorney, Agent, or Firm*—Michael Aronoff; Adan Ayala

(57) ABSTRACT

A knuckle joint locking and release mechanism for a power tool having a locking mode where relative articulation between two body portions of the power tool is prevented and a release mode where relative articulation between the two body portions of the power tool is unhindered. The knuckle joint locking and release mechanism is biased into the locking mode but can be placed into the release mode by engaging an actuator pushbutton located on either side of the knuckle joint.

10 Claims, 4 Drawing Sheets

KNUCKLE JOINT AND RELEASE/LOCKING MECHANISM THEREFOR

CROSS-REFERENCE TO RELATED APPLICATION

This application claims priority to European Patent Application No. EP 04256943.4, filed Nov. 10, 2004. The entire contents of that application are expressly incorporated herein by reference thereto.

FIELD OF THE INVENTION

The present invention relates to a knuckle joint mechanism which allows relative movement of one body part with respect to another body part, and a release/locking mechanism therefor. The invention is described herein with reference to hand-held motor operated power tools. However it is understood that such a knuckle joint and mechanism can find a use in many other applications. Thus, the present invention is not considered to be confined to power tools.

BACKGROUND OF THE INVENTION

Knuckle or articulating joints in power tools are well known and have been used to provide an articulating body arranged such that a handle portion of the tool's body can pivot about a point or axis on the motor housing portion of the tool's body. The pivoting axis is typically along a common mating plane of the two portions of the tool's body. Such a system is exemplified in U.S. Pat. No. 6,364,033 which describes a portable electric tool having an elongate housing which includes two housing members pivotally connected to one another. A locking mechanism is provided for adjustably positioning the second housing member relative to the first housing member. The mechanism includes a pin disposed in a passage, biased against a spring, and which is shiftable between a locking and unlocking position. A locking member is adapted to shift the pin between a locking and unlocking position. This arrangement provides a knuckle joint locking mechanism which is actuated from one side of the power tool housing.

U.S. Pat. No. 5,867,911 describes an apparatus for adjusting relative positions of first and second members. The apparatus comprises two buttons each with two sets of teeth and which are moveable between respective first and second positions. When in a first position, both sets of teeth engage with other sets of teeth carried by the first and second members to prevent relative movement of the first and second members. When in a second position, one set of teeth carried by the button disengages one set of teeth carried by one of the first and second members to allow relative movement thereof. This arrangement has two actuating buttons disposed on either side of the knuckle joint, and both buttons have to be moved or 'pinched together' (compressed inwardly) in order to allow relative movement of the first and second members.

Many other forms of knuckle joint are known. For instance, U.S. Pat. No. 2,921,773, U.S. Pat. No. 4,929,113 and U.S. Pat. No. 5,358,352 describe a knuckle joint locking mechanism which is actuated by pressing a button disposed on one side of the joint. Furthermore, U.S. Pat. No. 5,197,817 describes a locking mechanism for a gimbal joint which has a pair of actuator buttons disposed on either side of the gimbal joint, both of which have to be depressed in order to unlock the joint and allow the joint to articulate.

Referring to FIG. 1, a schematic of Black and Decker's™ KC9036 3.6V cordless screwdriver's articulating joint 10 is shown. The joint is arranged to allow relative movement between first 12 and second 14 portions of the screwdriver's body 16. The second portion of the body extends inside first portion in the region of the knuckle joint. The first and second portions pivot with respect to one another about the axis A as indicated by arrow Z. A locking mechanism comprises a first 20 and second 22 sliding cog. Each cog has toothed portions 24 and 26 respectively, and these are held together by a screw fitting 23 passing through the second cog to engage with the first cog. The first and second body portions also comprise toothed portions 30 and 32 respectively. A spring 28 provides a biasing force to maintain the locking mechanism in a locked position, as is shown in FIG. 1. The spring is held between a body portion and the first sliding cog.

In the locked position the toothed portions 24 and 26 of the locking mechanism mesh with both the toothed portions 30 and 32 of the first and second body parts, 12 and 14 respectively. Thus, the first and second body parts are locked to prevent relative movement therebetween; the articulating joint is locked. In order to unlock the articulating joint, the first cog is pressed into the joint, as indicated by arrow B. A portion of the first cog's toothed portion 24 is disengaged from the screwdriver body's first portion's toothed portion 30. Likewise, a portion of the second cog's toothed portion 26 is disengaged from the screwdriver body's second portion's toothed portion 32. The spring 28 is compressed as a result, between an inner face 33 of the first cog and an inner face 34 of the second body portion. Relative rotational movement is thus permitted between the first and second body portions. The locking mechanism returns to the locking position by releasing pressing force on the first cog (as indicated by B) and when teeth in toothed portion 30 and 32 are radially coincident, so that the cogs can return to the locking position.

The prior art provides a mechanism which can be actuated from just one side of the articulating joint, or by pressing a pair of locking buttons into the joint at the same time. The typical single button operated knuckle joint usually has the button for releasing the locking mechanism disposed on the side of the tool which is most convenient for a right-handed user to depress the button with their thumb whilst gripping the tool.

Embodiments of the present invention aim to provide an improved knuckle joint and locking mechanism. In brief, embodiments of the present invention provide a knuckle joint and locking mechanism which can be actuated from either one side or the other side of the joint.

BRIEF SUMMARY OF THE INVENTION

More precisely, the present invention provides a knuckle joint arranged to provide relative movement between a first and second body member about an axis, said first and second body members having at least one joint member arranged to cooperate with a joint member on the other body member, said mechanism comprising an actuator having engagement means arranged to cooperate with receiving means on the joint members of either the first and/or second body members, said actuator being moveable in a first direction with respect to the body members between a locking position in which the engagement means cooperate with receiving means on both body members thereby preventing relative movement of the body members, and a first releasing position in which the second body member is moveable with respect to the first body member, characterised in that the actuator is also moveable in a second direction between the locking position and a second releasing position. The second direction can be different to the first direction thus allowing the locking mechanism to be operable from more than one side of the knuckle joint.

Preferably, the actuator is moveable along the pivot axis. This arrangement can reduce the number of parts required in a knuckle joint embodying the present invention.

Preferably, the first and second release positions are either side of the locking position. Thus, the actuator can operate in a push/pull mode, or the actuator can be manually operated from either side of the knuckle joint. Alternatively, the actuator is arranged to be operable from a first or second side of the knuckle joint by pressing the actuator into the joint from either side of the joint. Thus, the actuator can be manually operated from either side of the knuckle joint.

Preferably, the first and second directions are co-axial with one another and the pivot axis. Thus, the actuator can be co-axial with the pivot axis. In this arrangement the actuator can be arranged to slide or move between the locking and releasing positions along the pivot axis.

Preferably, the knuckle joint also comprises a resilient spring arranged to urge the actuator towards the locking position. Thus, the default position of the mechanism is to lock the first and second body portions with respect to one another. This prevents inadvertent movement of the body portions, or of the actuator since the spring's resilience needs to be overcome before the articulating joint is unlocked.

The present invention also provides for a hand-operated, motor-driven screwdriver comprising a knuckle joint provided by the present invention. Preferably, the motor is disposed in the first body member and a battery and switch are disposed on or in the second body member, said switch being arranged to interrupt power supplied to the motor from the battery. Thus, a well-balanced, ergonomic screwdriver with multiple, easily adjustable body configurations can be provided. This provides multiple positions in which the screwdriver body parts can be arranged relative to one another, according to the user's needs.

BRIEF DESCRIPTION OF THE INVENTION

An embodiment of the present invention is now described, by way of example, with reference to the accompanying drawings, of which;

DETAILED DESCRIPTION OF THE INVENTION

Figure 1:
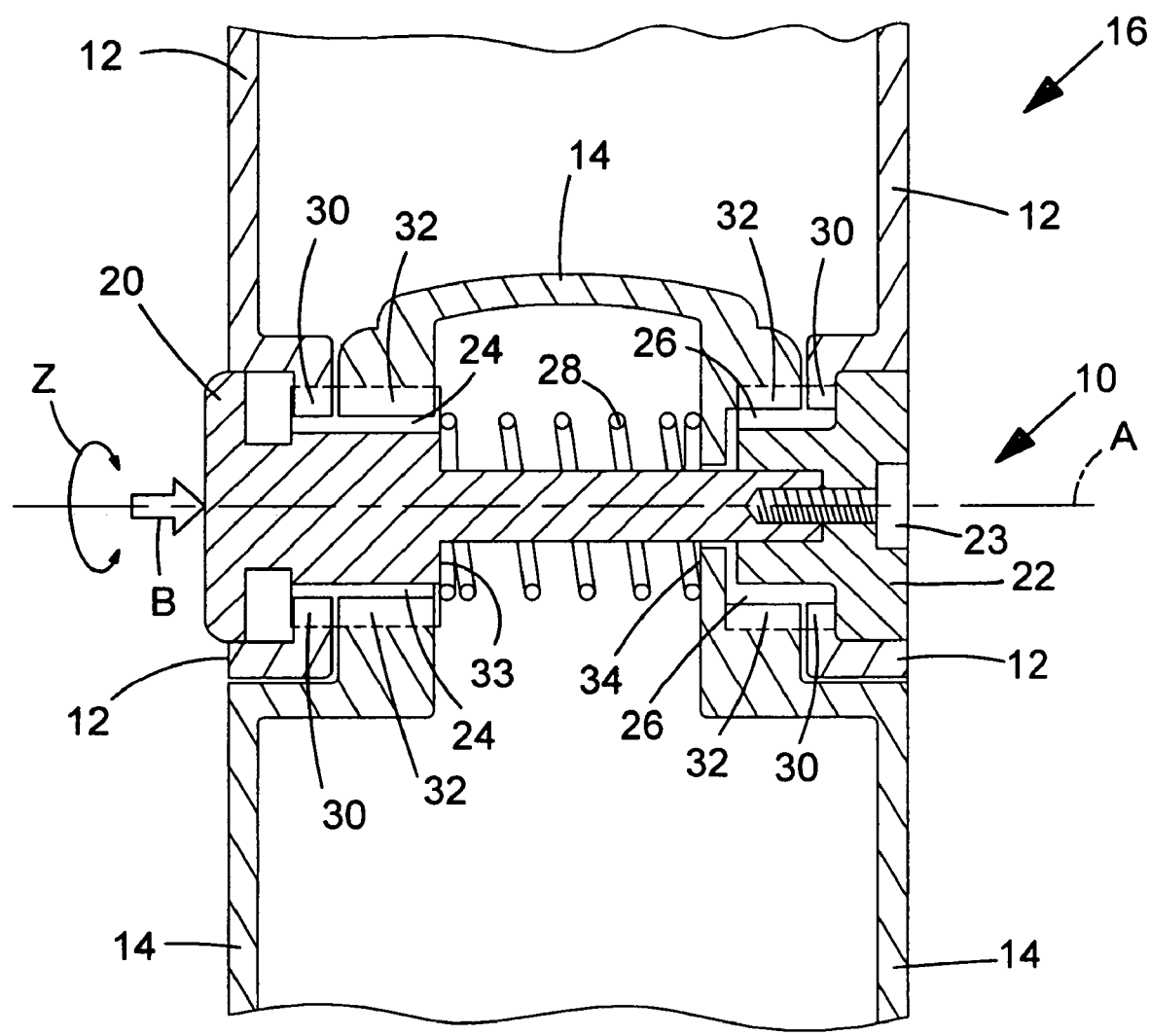
FIG. 1 is a schematic representation of a known articulating joint, shown in cross section.
Figure 2:
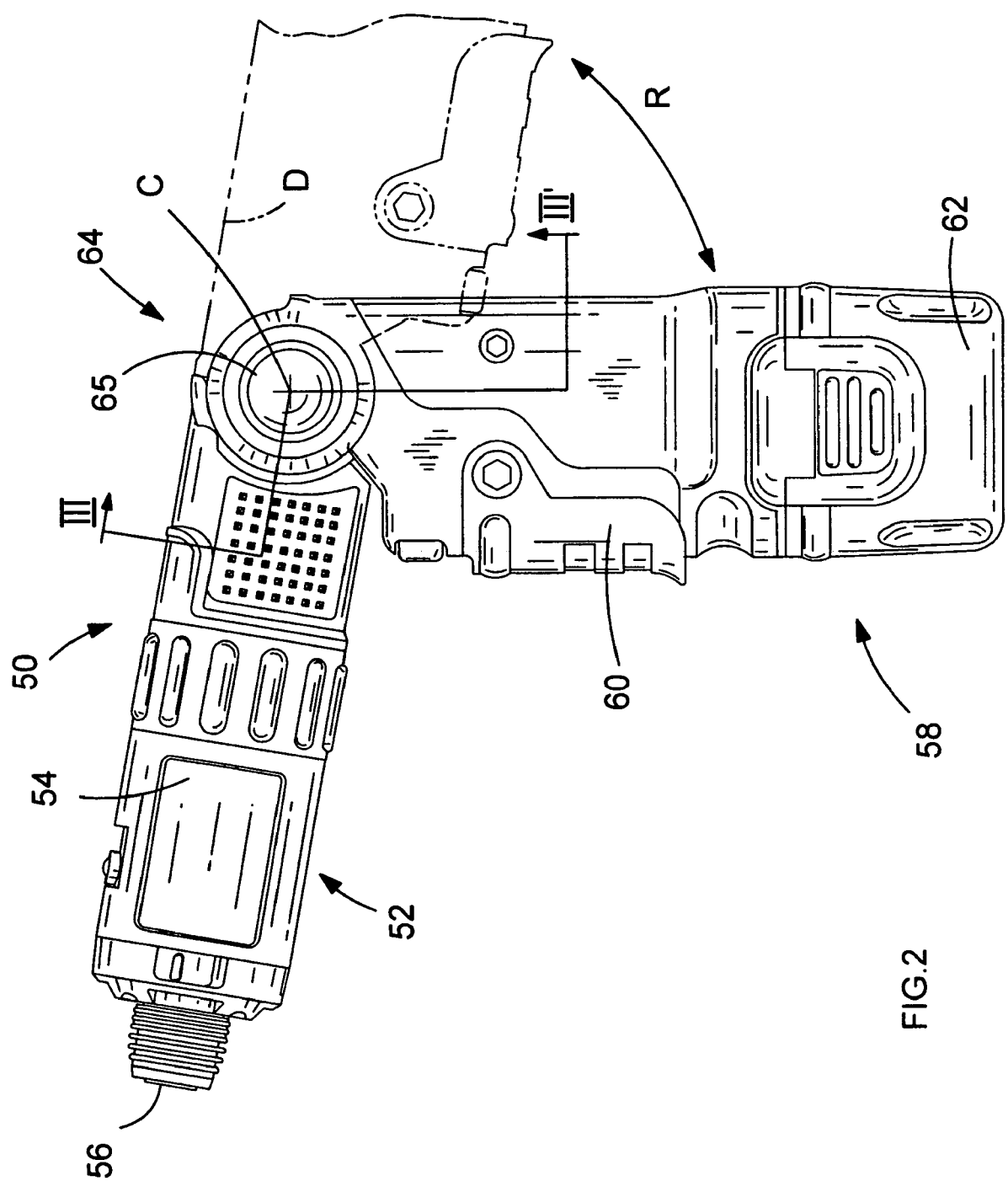
FIG. 2 is a schematic diagram of a screwdriver comprising a knuckle joint embodying the present invention.

Referring now to FIG. 2, a screwdriver 50 embodying the present invention is shown. The screwdriver comprises a first body portion 52 having a gear box and motor housing 54. The screwdriver's output spindle 56 is disposed at one end of housing 54. A second body portion 58 comprises a switch 60 and removable battery pack 62. The battery pack is removable to allow recharging of the battery in a dedicated recharger unit. The switch and any associated electronic circuits are used to control the speed of the motor. Each of the body portions are made in a clam-shell construction method from injection moulded plastic parts.

The screwdriver comprises a knuckle joint 64, embodying the present invention. The joint provides a means for pivoting the second body portion, relative to the first body portion, about axis C. Thus, the second body portion can rotate about axis C between a first, angled position, and a second in-line position, as indicated by dotted line D and arrow R. The knuckle joint comprises a pushbutton 65 which is manually pushed into the joint to release a locking mechanism and allow the relative movement of the first and second body portions, 52 and 58 respectively.

Figure 3:
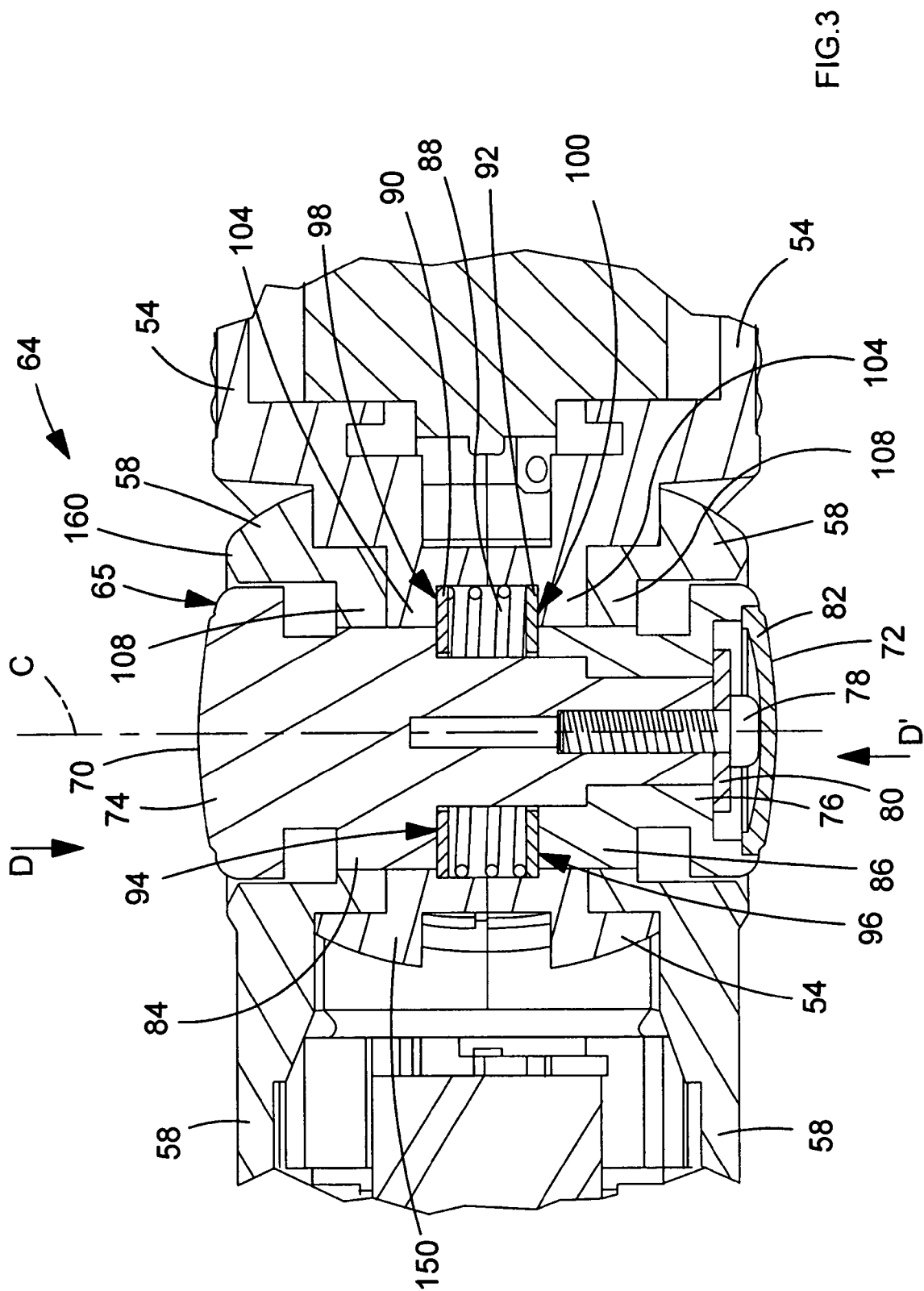
FIG. 3 is a schematic cross-sectional diagram of the knuckle joint shown in FIG. 2, along lines III and III'.

Referring now to FIG. 3, a cross-section of the knuckle joint 64 along line III III' is shown. Like numerals are used to indicate elements of the knuckle joint which are also shown in FIG. 2. The pushbutton actuator assembly 65 is disposed coaxial to the pivot axis C about which the first and second body portions can rotate with respect to one another. The pushbutton assembly 65 can be pressed into the knuckle joint from either side of the joint. In other words, the pushbutton has two faces 70 and 72 respectively on which a user can press to operate the knuckle joint locking/release mechanism.

The pushbutton 65 comprises two portions 74 and 76 respectively. These portions are held together by a threaded screw fixing 78 and washer 80, which prevent any relative axial movement of portions 74 and 76, while allowing relative rotation of the two parts about axis C. The screw and washer are hidden from the user's view by a cover member 82. Each of the pushbutton portions 74 and 76 has teethed portions 84 and 86 respectively. These teeth extend longitudinally with respect to axis C. Likewise, the first and second body portions 54 and 58 have toothed portions 104 and 108 which are arranged to cooperate or mesh with, or receive the teeth of pushbutton portions 74 and 76. A spring 88 is arranged between two washers 90 and 92. Each washer 90, 92 is arranged to overlap and cooperate with inner surfaces 94 or 96 of the first or second pushbutton portions 74 or 76 respectively, and inner facing surfaces 98 or 100 of the first body portion 54 respectively.

The arrangement in FIG. 3 is shown with the spring in its most relaxed position, and with the pushbutton arranged to lock the first and second body portions with respect to one another. The longitudinal teeth 84 and 86 of the pushbutton are in engagement with both the toothed portions 104 and 108 of body portions 54 and 58. Thus, with the pushbutton in the position shown in FIG. 3, the teeth of the pushbutton portions act to lock the body portions in such a way as to prevent relative movement of the body portions 54 and 58 about axis C.

The knuckle joint can be operated in the following manner. A user can push the pushbutton into the knuckle joint by pressing against either surface 70 or 72, in the directions indicated by arrow D or D'. In either case, the pushbutton can be depressed by a distance into the joint sufficient for the toothed portions 84 and 86 to disengage with toothed portion 108 of the second body member 58, and toothed portion 104 of the first body member 54. Once the pushbutton is depressed in the direction indicated by arrow D by a sufficient distance for the teeth to disengage as described above, the teeth 84 of the pressed first pushbutton portion 74 is locked radially only in the teeth 104 of first body portion 54, and the teeth 86 of the second pushbutton portion 76 is locked radially only in the teeth 108 of second body portion 58. Therefore the two body portions 54 and 58 are free to rotate about axis C. Similarly, when the pushbutton is depressed in the direction indicated by arrow D' by a sufficient distance, the teeth 86 of the second pushbutton portion 76 disengaged with the teeth 108 of second body portion 58 and teeth 84 of first push button portion 74 disengage with teeth 104 of first body portion 54. Thus, the two body portions are free to rotate about axis C.

Depressing the pushbutton causes the spring 88 to become compressed. Thus, the user has to apply sufficient force to overcome the resilience of the spring in order to operate and release the knuckle joint. In order to reduce the space required to accommodate the spring in a compressed state, a conical spring or a flat wire wave compression spring might be employed.

On releasing the force necessary to depress the pushbutton into the joint the spring urges the pushbutton into a locking position. However, the pushbutton can only return to the locking position when the gaps between the toothed portions 104 and 108 are aligned sufficiently to receive the toothed portions 86 and 84 of the pushbutton. Thus, the user can press the pushbutton to unlock the knuckle joint, rotate the first and second body members 54 and 58, release the pushbutton, and continue rotating the body members until the pushbutton springs into a locking position. Put another way, the pushbutton is said to be floating in the knuckle joint and urged towards a locking position by the spring.

Figure 4:
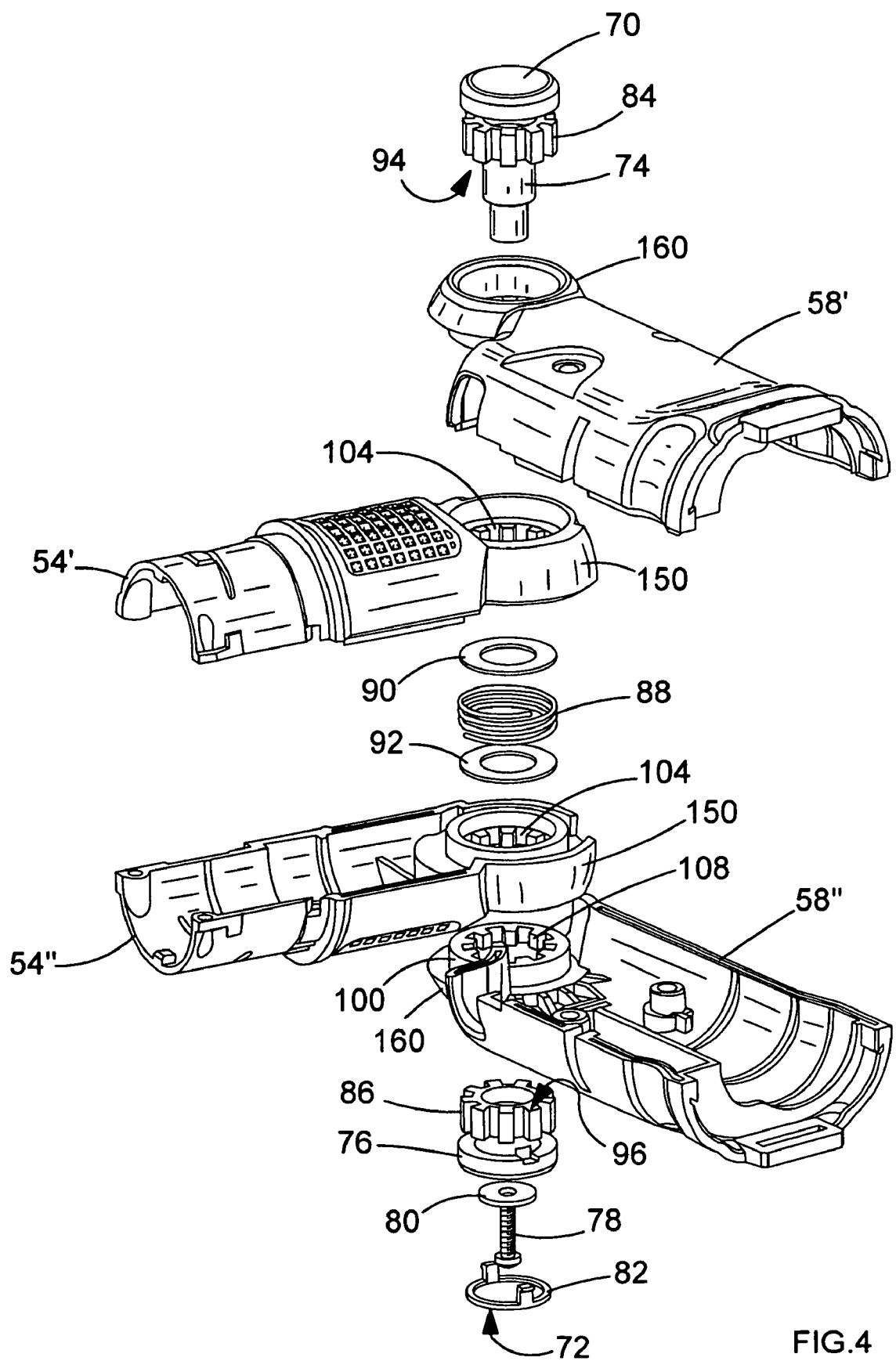
FIG. 4 is an exploded view of the elements of the knuckle joint shown in FIG. 3.

Referring now to FIG. 4, an exploded view of the knuckle joint components is shown. Elements of the knuckle joint which are common to FIGS. 2 and 3 are indicated by the same numerals. The body portions 54 and 58 are made of a clam-shell moulded construction and the constituent parts are indicated by 54', 54", 58' and 58" respectively. FIG. 4 shows the knuckle joint exploded along the direction of axis C. Joint member portions 150 and 160 of body parts 54 and 58 respectively are arranged to cooperate with one another to allow relative movement of the body parts 54 and 58 about axis C. The joint members have cooperating sliding surfaces which engage with one another in use and act as a guide to the relative movement of body part 54 and 58. The toothed portions 104 and 108 are disposed in the respective joint member portions.

Thus, the pushbutton is operable from either side of the knuckle joint. This arrangement has many advantages, such as providing an ambidextrous knuckle joint, or providing a knuckle joint which can be operated in situ where (for instance) the screwdriver is held in a confined space, without having to remove the screwdriver from that confined space.

Other embodiments of the present invention will be envisaged by the skilled person without leaving the scope of the claims. For instance, the pushbutton might have a tang or gripping protrusion extending from a surface so that it can be operated from one side of the knuckle joint by either pushing the pushbutton into the joint or by gripping the tang and pulling the pushbutton out of the knuckle joint.

The invention claimed is:

1. A hand-operated, motor driven screwdriver comprising:
a body having a knuckle joint mechanism providing relative pivotal movement between a first and second body member about a pivot axis, said first and second body members each having axially spaced first and second sets of teeth, said mechanism comprising:
an actuator having a first and a second push button portion, the first and second push button portions being coaxially aligned on the pivot axis and each having a set of teeth arranged to engage the sets of teeth of the first and second body members, said first and second push button portions being moveable along the pivot axis relative to the body members, between a locking position in which both sets of push button portion teeth engage both first and second sets of body members teeth, and (a) a first release position in which the set of first push button teeth engages the first body member first set of teeth only and the set of second push button teeth engages the second body member first set of teeth only and (b) a second release position, in which the set of first push button teeth engages the second body member second set of teeth only and the set of second push button teeth engages the first body member second set of teeth only, the first push button portion being rotatable about the pivot axis relative to the second push button portion to enable the second body member to move with respect to the first body member when the actuator is in either the first release position or the second release position.

2. The screwdriver of claim 1, wherein the actuator is moveable in a first direction from the locking position to the first release position, and the actuator is moveable in a second direction from the locking position to the second release position.

3. The screwdriver of claim 2, wherein the first and second directions are co-axial with one another.

4. The screwdriver of claim 2, wherein the first and/or second directions are co-axial with or parallel to the pivot axis.

5. The screwdriver of claim 1, wherein the actuator is operable from a first and second side of the knuckle joint.

6. A knuckle joint mechanism providing relative pivotal movement between a first and second body member about a pivot axis, said first and second body members each having axially spaced first and second sets of teeth, said mechanism comprising:
an actuator having a first and a second push button portion, the first and second push button portions being coaxial on the pivot axis and each having a set of teeth, said first and second push button portions being moveable along the pivot axis relative to the body members, between a locking position in which each of the sets of push button portion teeth engage a set of teeth on both the first body member and the second body member, and (a) a first release position in which the set of first push button portion teeth engages the first set of teeth of the first body member only and the set of second push button portion teeth engages the first set of teeth of the second body member only and (b) a second release position in which the set of first push button teeth engages the second set of teeth of the second body member only and the set of second push button teeth engages the second set of teeth of the first body member only, the first push button portion being rotatable about the pivot axis relative to the second push button portion to enable the second body member to move with respect to the first body member when the actuator is in either the first release position or the second release position.

7. The mechanism of claim 6, wherein the actuator is moveable in a first direction from the locking position to the first release position, and the actuator is moveable in a second direction from the locking position to the second release position.

8. The mechanism of claim 7, wherein the first and second directions are co-axial with one another.

9. The mechanism of claim 7, wherein the first and/or second directions are co-axial with or parallel to the pivot axis.

10. The mechanism of claim 6, wherein the actuator is operable from a first and second side of the knuckle joint.

* * * * *